June 10, 1930.  R. E. DE GOLYER  1,762,573
NUT CRACKER
Filed June 11, 1929
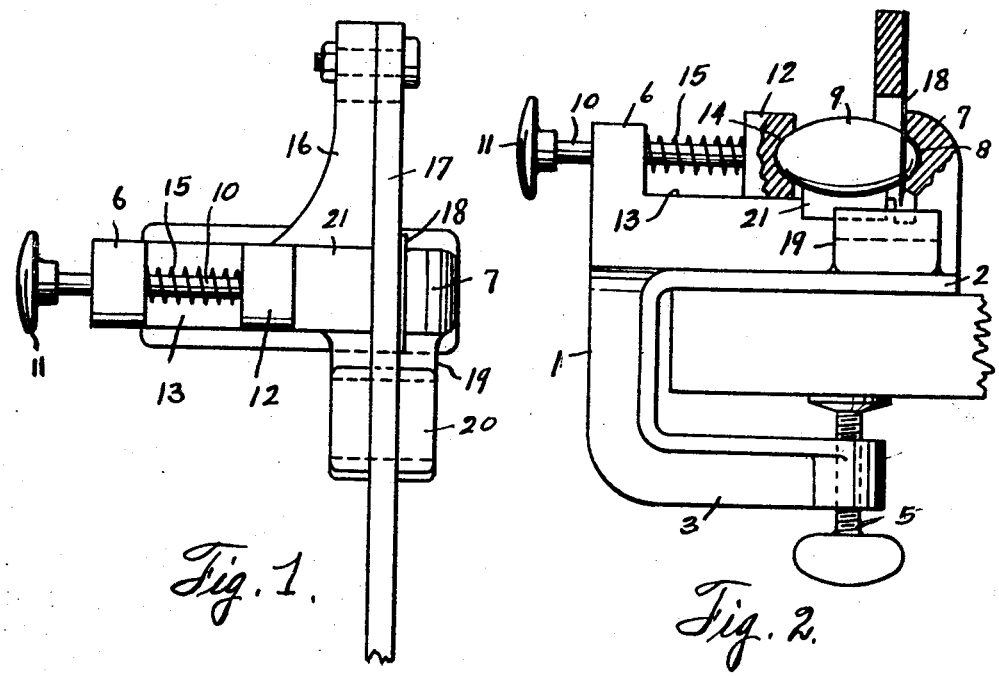
Fig. 1.
Fig. 2.
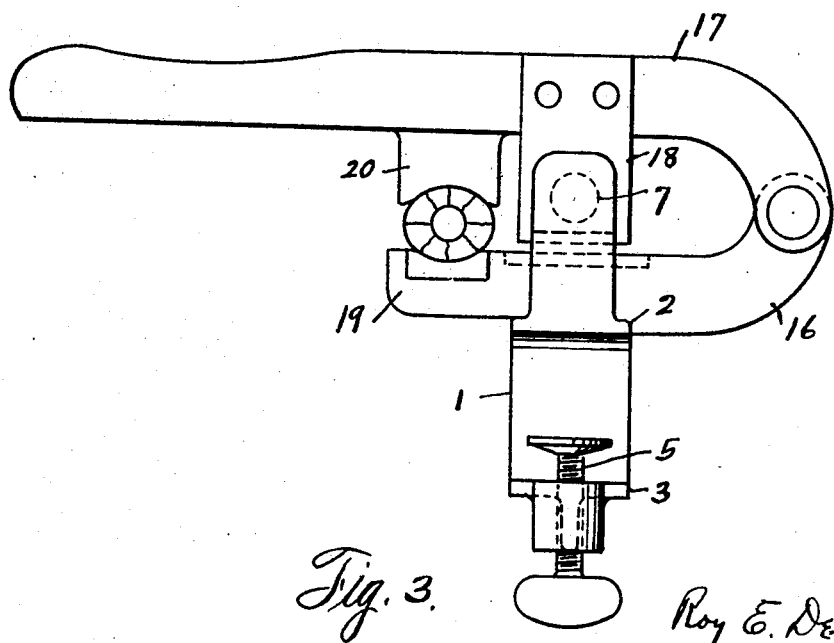
Fig. 3.
Inventor
Roy E. DeGolyer
By
Hardway Cathey
Attorneys Patented June 10, 1930

1,762,573

UNITED STATES PATENT OFFICE

ROY E. DE GOLYER, OF HOUSTON, TEXAS

NUTCRACKER

Application filed June 11, 1929. Serial No. 370,009.

This invention relates to new and useful improvements in a nut cracker.

One object of the invention is to provide a device of the character described whereby the shells of such nuts, as pecans, and similar nuts, may be cracked and broken without materially injuring the kernels, to the end that said kernels may be removed substantially whole.

Another object of the invention is to provide a nut cracker of the character described equipped with means for cutting off the ends of the shell preparatory to cracking the shell, thereby rendering the cracking operation easier and lessening the liability of breaking the kernel.

With the above and other objects in view this invention has particular relation to certain novel features of construction, operation and arrangement of parts an example of which is given in this specification and illustrated in the accompanying drawings, wherein:—

Figure 1 shows a plan view of the device.

Figure 2 shows a fragmentary side view, shown partly in section, and

Figure 3 shows an end view thereof.

Referring now more particularly to the drawings, the numeral 1 designates a U-shaped bracket having the upper and lower arms 2 and 3, spaced apart to receive the edge of a table 4, or other support, between them. Threaded through the free end of the arm 3, there is the usual clamp screw 5, for the usual and obvious purpose.

The upper arm 2 has an upstanding bearing 6, at one end, and an opposing upstanding fixed chuck 7 at its other end. The inner face of the chuck has the cavity 8 to receive one end of the nut 9 to be cracked.

There is a rod 10 slidable through the bearing 6 and whose outer end has the grip 11 fixed thereon. Attached to the inner end of said rod there is a movable chuck 12, which is slidable on the track 13, and whose side, facing the chuck 7, has a cavity 14, to receive the other end of the nut 9.

Surrounding the rod 10 and interposed between the bearing 6 and chuck 12 there is a strong coil spring 15, which operates against the movable chuck 12 and is effective to hold the nut in position between said chucks, when placed therein.

Extending laterally from the upper arm 2 there is an upwardly curved anchor 16 to whose free end one end of the handle 17 is pivotally connected. This handle extends across the upper arm 2 and has the depending blade 18 secured thereto which works adjacent the inner face of the chuck 7.

There is a fixed jaw 19 extending out laterally from the arm 2 opposite the anchor 16 and depending from the handle 17 above the jaw 19 there is a cooperating jaw 20.

Between the chucks 7, 12 and mounted on the upper arm 2 there is a nut bed 21, preferably formed of slightly yieldable material.

In use, the movable chuck 12 is drawn outwardly to permit the insertion of the nut to be cracked and said nut is inserted between the chucks on the bed 21 and the movable chuck released to cause the ends of the nut to seat in the sockets 8, 14. The nut may be held firmly between said chuck by pressure applied inwardly to the grip 11. When the nut is inserted between the chucks the handle 17 is elevated and when the nut is in place said handle may be forced downwardly causing the blade 18 to cut off the end of the nut shell. The position of the nut is then reversed and the other end of the shell may be cut off in the manner above stated. The nut as thus prepared may then be removed and placed on the jaw 19 and another nut placed between the chucks, as before, and the handle 17 again depressed with the result that the shell of the nut on said jaw 19 will be cracked and at the same time, and by the same stroke, the end of the shell of the nut held between the chucks will be cut off. When the ends of the shell are cut off the shell will easily break lengthwise, at a number of places around the nut, when placed between said jaws, and the kernel will not be broken and may be taken out substantially whole.

What I claim is:

1. A nut cracker including a U-shaped bracket adapted to be fastened to a stationary object, a fixed and a movable chuck thereon arranged to receive a nut between them, a handle, a blade carried by the handle and disposed in a plane at substantially right angles to the axis of said chucks and means normally holding the movable chuck against the nut to be cut.

2. A nut cracker including a bracket, a fixed chuck thereon, a movable chuck confronting and spaced from the fixed chuck, a yieldable member operable against the movable chuck and effective to hold said movable chuck against a nut placed between said chucks, a transversely disposed handle above and pivotally connected to the bracket, a blade attached to and depending from said handle and arranged to cooperate with one of said chucks to sever the corresponding end of said nut.

3. A nut cracker including a bracket, a fixed chuck thereon, a movable chuck confronting and spaced from the fixed chuck, a yieldable member operable against the movable chuck and effective to hold said movable chuck against a nut placed between said chucks, a transversely disposed handle above and pivotally connected to the bracket, a blade attached to and depending from said handle and arranged to cooperate with one of said chucks to sever the corresponding end of said nut, and a nut receiving bed on the bracket between said chucks.

4. A nut cracker including a bracket, a fixed and a movable chuck thereon arranged to receive a nut between them, a handle, a blade carried by the handle and disposed in a plane at substantially right angles to the axis of said chucks, and cooperating jaws, one carried by the bracket and the other carried by said arm, and means effective to hold the movable chuck against the nut.

5. A nut cracker including a support, a movable and an immovable chuck for holding a nut between them, a spring adapted to hold the movable chuck normally against the nut, and means for severing one end of said nut therefrom while held by said means.

6. A nut cracker including a support, spaced means thereon for holding a nut between them comprising a slidable chuck under tension and a stationary chuck, said means being releasable from the nut to permit its reversal, means on the support arranged to cooperate with one of said holding means and adapted to sever the corresponding end of said nut.

7. A nut cracker including a support, spaced chucks thereon for holding a nut between them, one of said chucks being removable from the nut to permit its reversal, means on the support arranged to cooperate with one of said holding chucks and adapted to sever the corresponding end of said nut, and cooperating jaws one carried by the support and one carried by said severing means.

8. A nut cracking device comprising a supporting frame, chucks thereon for releasably holding a nut, means for holding one of said chucks under tension, a blade disposed at right angles to the chucks, means for actuating said blade to effect the severing of the end of the nut therefrom, a nut supporting jaw carried by said frame, and a jaw carried by said blade actuating means and cooperative with said supporting jaw to crack a nut on the latter when said blade actuating means is operated.

In testimony whereof I have signed my name to this specification.

ROY E. DE GOLYER.